G. P. BAUMANN.
WIRE STITCHING MACHINE.
APPLICATION FILED AUG. 27, 1914.

1,226,170.

Patented May 15, 1917.
6 SHEETS—SHEET 5.

Witnesses:
Chas. H. Buell.
Irwin C. Bowman.

Inventor:
Gottfried P. Baumann,
By Dyrenforth, Lee, Chritton & Wiles,
Attys.

UNITED STATES PATENT OFFICE.

GOTTFRIED P. BAUMANN, OF CHICAGO, ILLINOIS, ASSIGNOR TO LATHAM MACHINERY COMPANY, OF CHICAGO, ILLINOIS, A CORPORATION OF ILLINOIS.

WIRE-STITCHING MACHINE.

1,226,170. Specification of Letters Patent. Patented May 15, 1917.

Application filed August 27, 1914. Serial No. 858,796.

*To all whom it may concern:*

Be it known that I, GOTTFRIED P. BAUMANN, a citizen of the United States, residing at Chicago, in the county of Cook and State of Illinois, have invented a new and useful Improvement in Wire-Stitching Machines, of which the following is a specification.

My invention relates to improvements in wire-stitching machines and more particularly that type of wire stitcher in which wire is fed from the spool, formed into a staple and the staple driven and clenched by automatic mechanism.

The particular object of the invention is to increase the facility of adjustment of machines of this character, so that they may be adapted more readily to take care of work of varying thicknesses. A further object of the invention is to improve the construction of the wire-feeding mechanism and of the tensioning means for the same. A still further object of the invention is to provide positively operating cams for driving the reciprocatory elements of the machine and to do away, in so far as possible, with spring-return devices and the like. Further objects and advantages of the invention will appear from the following detailed description of the embodiment of the same, shown in the appended drawings.

In these drawings

Figure 1:
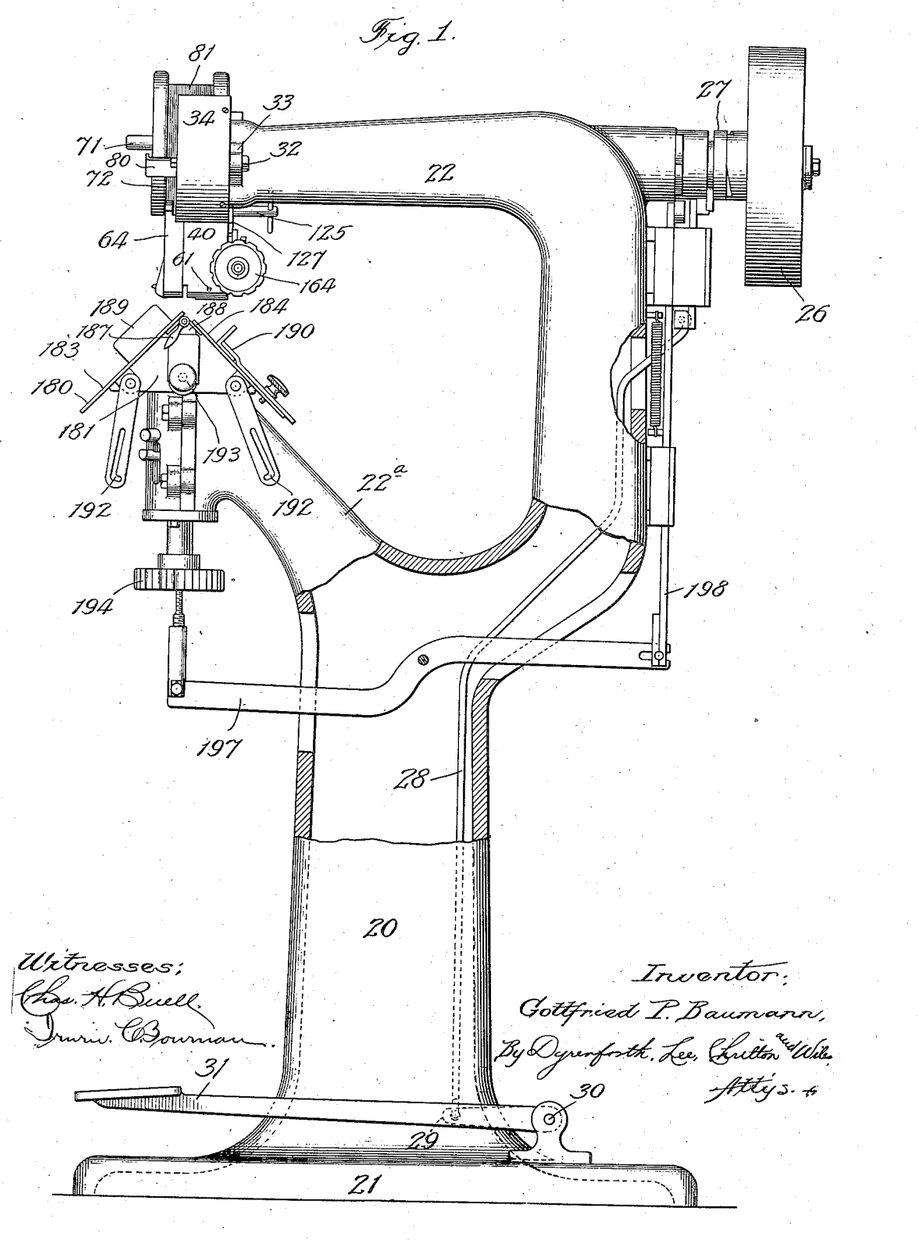
Figure 1 is a side elevation of a wire-stitching machine constructed in accordance with my invention, parts of the machine being broken away and parts shown in section.

Referring to Fig. 1 the frame of the machine comprises a supporting pillar 20 resting upon the foot 21 and carrying at its upper end the arms 22 and 22ª. The horizontal arm 22 carries the bearings for the drive-shaft 23, the front bearing of the shaft being shown as a flanged sleeve 24 locked within the core-end of the arm 22 by the babbitt 25'. The rear bearing of the drive-shaft, not shown, may be similarly formed. Upon the rear end of the drive-shaft is loosely mounted a belt-pulley 26 which may be engaged with the shaft by means of any desired form of automatically-disengaging clutch-mechanism here indicated generally by 27. The clutch-mechanism is put in operation through a link 28 which passes through the supporting pillar and is connected at the bottom to an arm 29 carried by a rock-shaft 30. The rock-shaft may be conveniently operated by a foot-lever 31 extending to the front of the machine. As is well understood in the art, depressing the foot-lever will cause the automatic clutch-mechanism 27 to become engaged for a single revolution of the pulley wheel 26, and at the end of the revolution the clutch will automatically disengage itself. This mechanism forms no part of my invention and will, therefore, not be particularly described.

Figures 10, 11, 12:
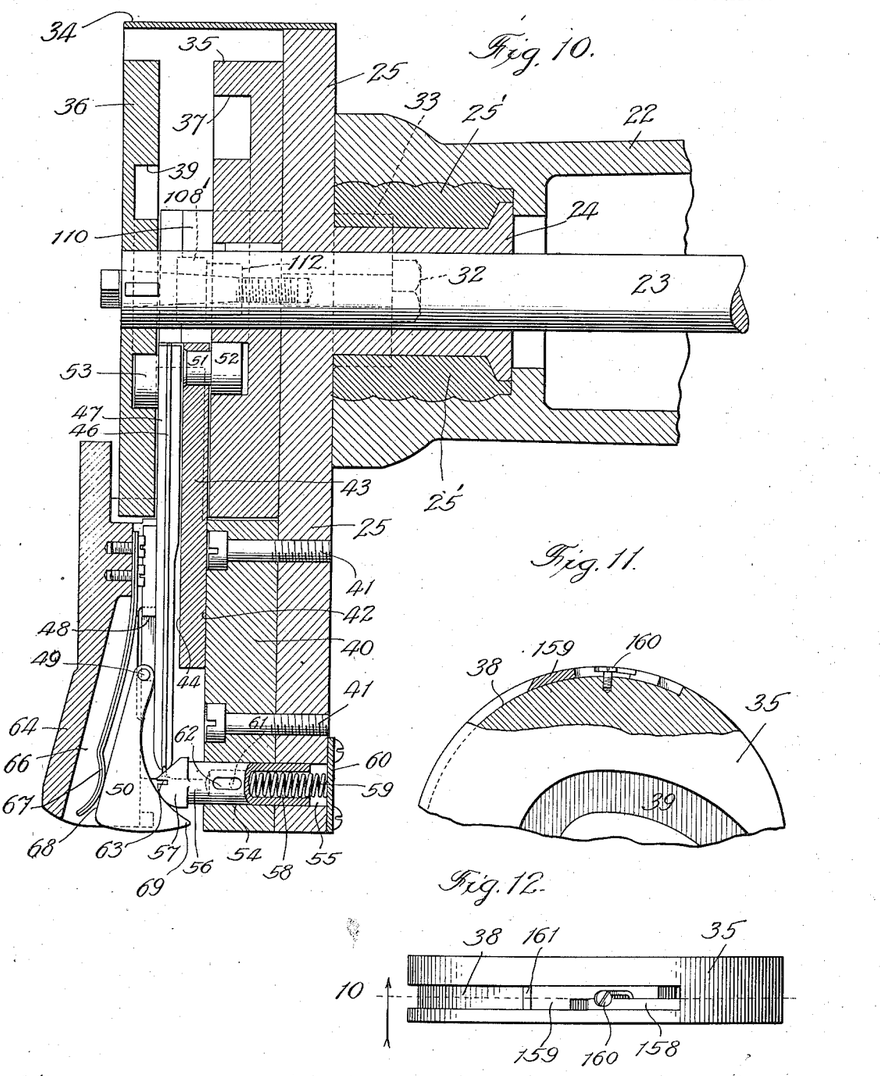
Fig. 10 is a sectional elevation of the staple-forming head.
Fig. 11 is a broken sectional view of the cam which drives the staple-former and wire-feeding mechanism.
Fig. 12 is an edge view of the cam shown in Fig. 11.
Figures 13, 14, 15, 16, 17, 18:
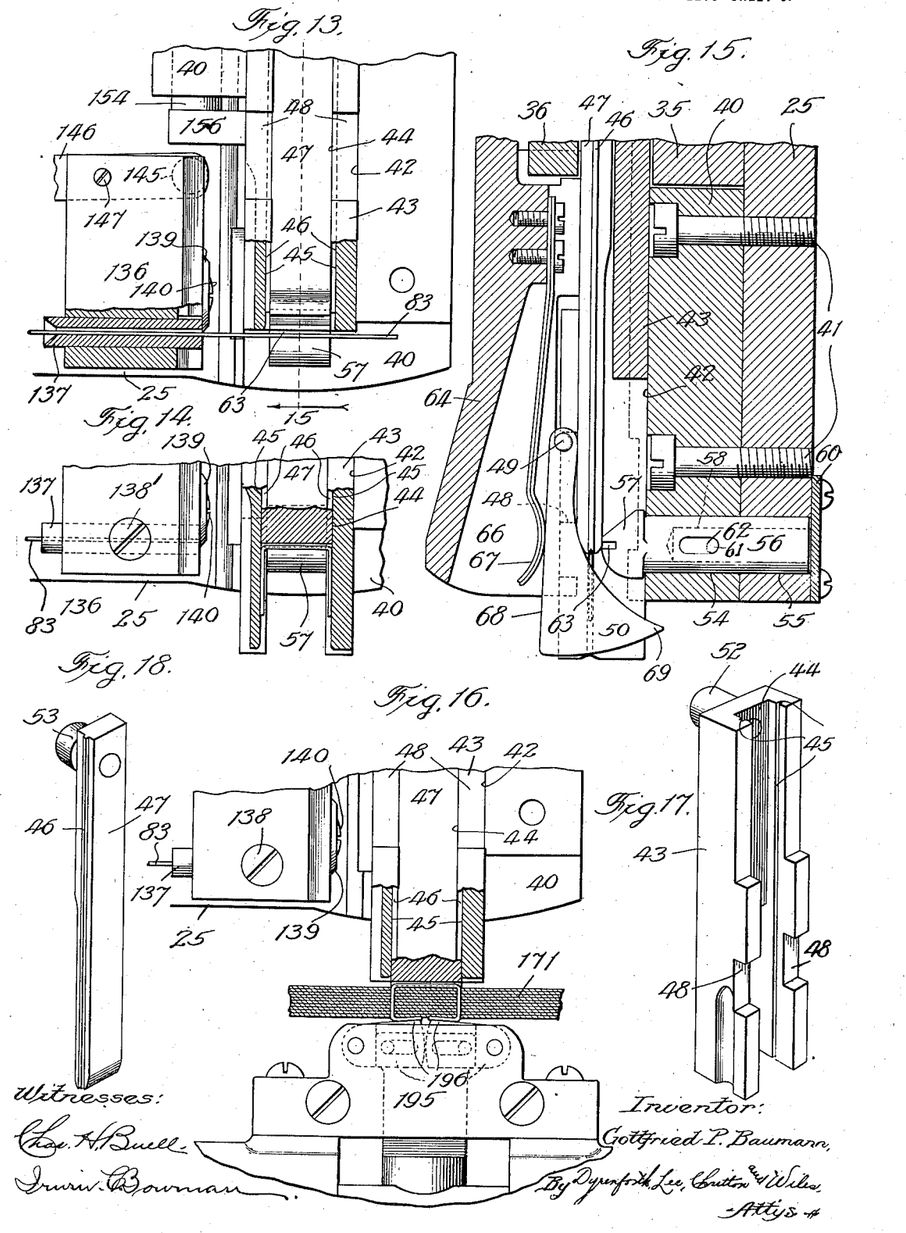
Fig. 13 is an enlarged detail of the cutter block, driver and former, parts being shown in section.
Fig. 14 is an enlarged sectional view of the former and driver, showing another position of the parts.
Fig. 15 is a section taken on the line 15 of Fig. 13, but with the cover-plate in position.
Fig. 16 is an enlarged view in elevation of the former and driver and of the clencher mechanism, the parts being shown in the position they assume when the staple has been driven and clenched.
Fig. 17 is a detail perspective view of the staple former.
Fig. 18 is a detail perspective view of the driver.

Referring to Fig. 10 it will be seen that the bearing-bushing 24 for the front end of the drive-shaft is formed integrally with the head-plate 25 of the machine. As a further means of securing the head-plate it may be bolted, as by bolts 32, to ears 33 cast integrally with the arm 22. A shroud or flange 34 is fastened to the periphery of the head-plate and serves to protect the moving parts which are mounted thereon. The end of the shaft 23 which projects through the head-plate 25 is slotted to form key-ways, and keys are inserted therein by means of which the cams 35 and 36 may be driven. The cam 35 is provided in its outer face with a cam groove 37, shown in full lines in Fig. 4, and on its periphery is formed a cam-track 38. The cam-groove 37 serves as a driving means for the staple-former and for the wire-feeding mechanism, while the external cam-groove 38 operates the wire cutter as will later appear. The cam 36 which is mounted upon the extreme end of the drive-shaft has an internally facing cam-groove 39 by which is actuated the staple-driver. Secured to the front face of the head-plate 25 is a guide block 40, the securing means being shown as cap-screws 41 having their heads countersunk within the outer face of the guide-block. In the front face of the guide block is formed a vertical slide-way 42 in which reciprocates a staple-former 43. This member is of generally rectangular form, as shown in Fig. 17, and is provided in its front face with the vertical channel 44 which serves as a slide-way for the staple-driver. The opposing faces of the channel 44 are grooved, as at 45, and these grooves receive corresponding tongues 46 on the edges of the staple-driver 47 (see Fig. 18). Notches 48 are milled in the front face of the staple-former intermediate its length to receive the pintles 49 of a staple-supporting block 50. The staple-former is driven from the cam-groove 37 by a pintle 51 which carries a roller 52 (see Fig. 10), operating within the groove 37. The staple-driver 47 is driven from the cam-groove 39 (see Fig. 10 and dotted lines Fig. 4), by a pintle and roller 53 which operates within this groove. In the lower end of the guide block 40 is a cylindrical bore 54 which registers with a similar bore 55 in the head-plate 25, and mounted within these registering bores is the stem 56 of the anvil 57. The anvil-stem is preferably hollow, as shown at 58, and within the hollow is placed a compression spring 59 which bears at its rear end upon a closure plate 60, suitably secured by screws or other fastening means to the rear face of the head-plate. The spring 59 constantly urges the anvil 57 forward, its movement in this direction being limited by a pin 61 which engages a slot 62 in the anvil-stem. This pin also acts to prevent rotation of the anvil. The anvil-head 57 is formed with an upper inclined face and a lower curved face, as shown in Fig. 10.

Intermediate the two faces is a wire-receiving groove 63.

The staple-former 43 and supporting block 50 are held in place by a face-plate 64, which is secured to the front face of the guide-block 40 by suitable fastening screws 65. This face plate is provided with a central longitudinal recess 66 which flares at the bottom (see Fig. 15), and within the recess is mounted a leaf-spring 67, the curved end of which bears against the rear face 68 of the supporting block 50 and thereby urges the curved toe 69 of the block backward. The rear face of the plate 64 bears against the flush surfaces of the former, driver and guide-block, and the driver and former are, therefore, restricted to a reciprocating motion within the slide-way of the guide-block. The construction so far described is common in wire-stitching machines of this general type, with the exception of the driving cams for the reciprocating parts.

Figures 2, 3:
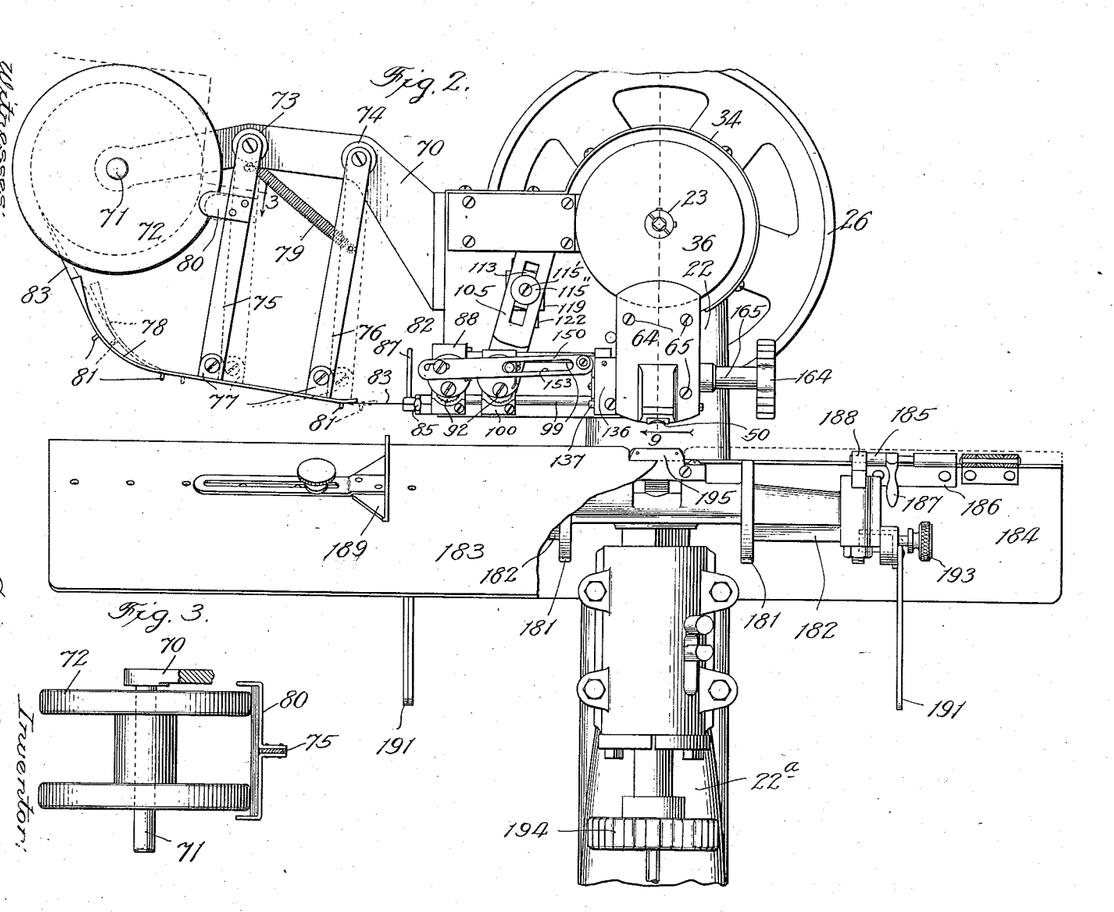
Fig. 2 is an enlarged front elevation of the head of the machine and the saddle.
Fig. 3 is a detail plan view of the wire spool and the brake for the same, taken substantially on the line 3 of Fig. 2.

My invention relates more particularly to the association with the driving cams of a wire-feeding, tensioning and cutting mechanism, an assembly of which is shown in Fig. 2. In this view an arm 70 is shown as secured to the side of the head-plate 25 and on the outer end of the arm is a journal pin 71 on which may be mounted a wire spool 72. Intermediate the length of the arm are lugs 73, 74, to which are pivoted the parallel links 75 and 76, respectively. The outer ends of these links are pivoted to suitable bosses 77 secured to the wire-guide 78, and the links are constantly pulled toward the spool 72 by a tension spring 79 fastened at one end to the arm 70 and at the other end to the link 76. Bearing upon the flanges of the spool 72 is a leather-faced brake-shoe 80 which is fastened to the link 75. As shown in Fig. 2, the wire is led from the periphery of the spool through guide-loops 81 on the outer face of the curved wire guide 78, and by means of this guide the wire is directed into substantial alinement with feeding mechanism generally designated by 82. The action of the braking means illustrated is peculiarly advantageous by reason of the fact that while the spool is normally held with considerable friction by the brake, the least pull on the wire by the feeding mechanism 82, will swing the levers 75 about their pivots, thus releasing the brake-shoe and permitting the spool to turn freely during the whole of the feeding movement. At the end of the feeding movement the spring 79 will again engage the shoe with the periphery of the spool and instantaneously stop the same. I am thus able to operate the machine at a relatively high speed without using a feeding mechanism which would grip the wire with force enough to bend or cut the same, and at the same time the brake when in contact with the spool is sufficiently strong to overcome the momentum of the latter and prevent it from overfeeding and buckling the wire. The dotted lines of Fig. 2 show the brake in the inoperative position it assumes during the feeding stroke.

Figure 4:
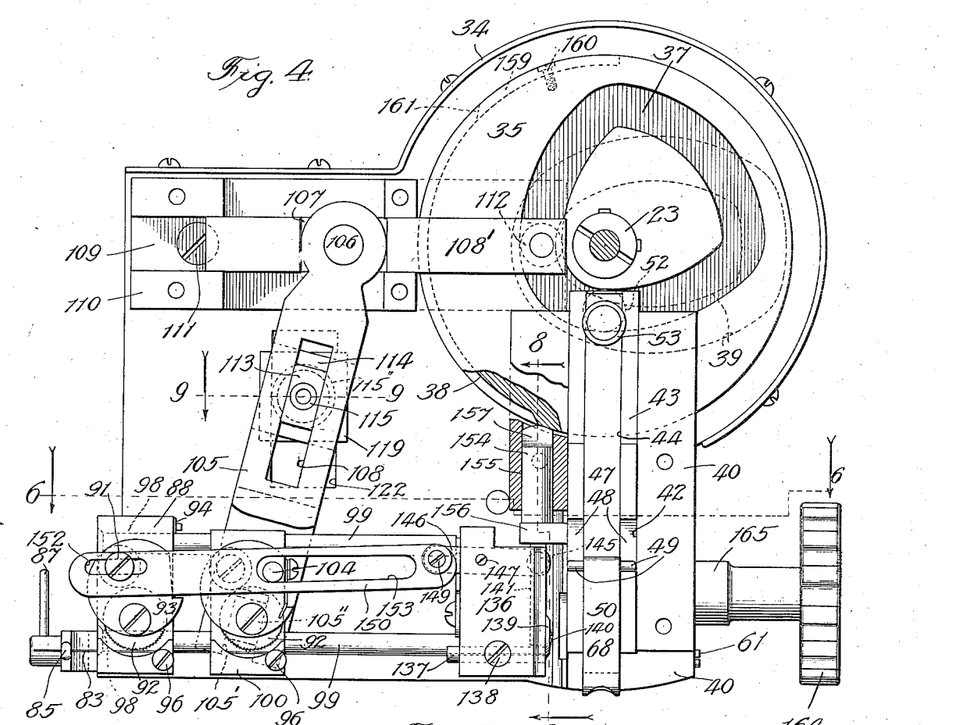
Fig. 4 is an enlarged front elevation of the staple-forming head of the machine, the front cam being removed.
Figure 5:
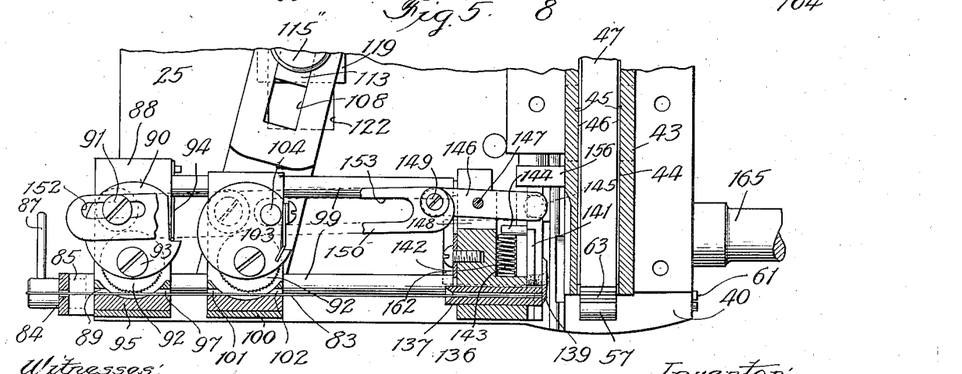
Fig. 5 is a section taken on the line 5—5 of Fig. 6.

Referring now to Figs. 4 and 5, it will be seen that the wire, indicated at 83, enters the feeding mechanism through an opening 84 in an arm 85. This arm, called the wire-straightener, is provided to guide the wire into the wire feeder and at the same time to give the wire a reverse curvature, if that is necessary, to correct any permanent set which the wire may have acquired by reason of being coiled upon the spool. In order to accomplish this purpose the arm 85 has a slotted foot 86 which, by means of a thumb-screw 87, is clamped in any desired position on the stationary block 88. By loosening the thumb-screw 87, the arm 85 may be moved to cause the wire-hole 84 to assume any desired position with respect to the wire-receiving opening 89 of the block 88, and accordingly, as the openings 84 and 89 are in alinement or out of alinement, the wire may be fed straight through or may be given a short-radius bend in any desired direction to correct its permanent set. The block 88 is secured by some suitable fastening means, not shown, to the head-plate 25, and on this block is mounted a wire check which comprises a plate 90 pivoted to the block, as by a screw 91, and carrying a toothed wheel 92 which may be secured in any desired angular adjustment by means of the screw 93. The plate 90 is urged downward by a small spring 94 fastened to the block 88. As is shown in Fig. 5, the wire-receiving opening 89 is formed not directly in the block 88 but in a pin 95 which is secured as by a set-screw 96 within a horizontal bore in the lower end of the block. The pin 95 has an arcuate recess in its upper face which joins the opening 89 to the wire outlet opening 97. This affords a slight clearance beneath the wire and makes more effective the action of the toothed wheel 92 in preventing backward movement of the wire. Adjacent its upper and lower ends the block 88 is drilled horizontally and in a plane parallel to the face plate 25 to provide guide-apertures 98 in which slide the ends of the parallel guide bars 99. Mounted for reciprocation on these guide bars is a feed-block 100 of a construction generally similar to that of the block 88; that is the feed-block has wire-receiving and discharge openings designated 101 and 102, and is equipped with a pivoted wire check 103 of the same general form as the check mounted on the block 88. The pivot screw of the check 103, however, is countersunk in the face of the check and the latter is provided with a cylindrical boss 104 offset from the pivot screw and projecting from the front face of the check.

Figure 9:
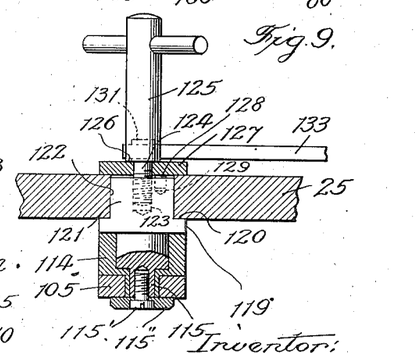
Fig. 9 is a detail section, taken on the line 9—9 of Fig. 4.

The driving means for the feed-block 100 comprises the rocking lever 105, the lower end of which is slotted as at 105' to receive a sliding block 105'' which is pivoted to the feed-block 100, and the upper end of which is journaled on a cylindrical boss 106 formed in the center of a recess 107 in the front face of the reciprocating bar 108'. The bar 108' is guided for horizontal reciprocation in a slide-way 109 formed in the face of a guide-block 110, which is secured as by suitable cap-screws 111 to the face of the head-plate 25. The front end of the reciprocating bar is provided with a pintle and roller 112, shown in dotted lines in Figs. 4 and 10, and engaging the cam-groove 37 so as to be actuated thereby. The lever 105 is formed with a rectangular aperture extending axially of the same, indicated at 108, and within this aperture the rectangular shouldered end 113 of the movable pivot block 114 moves. The block 114 is pivoted as by a cylindrical boss 115 formed on the front face of the adjustable block 119, the lever 105, and the blocks 114 and 119 being held in their assembled positions by means of the cap screw 115' and washer 115'', as shown in Fig. 9. Referring to this figure it will be seen that the block 119 is of generally rectangular form and provided with shoulders 120 which bear upon the front face of the head-plate 25 and a body-portion 121 which lies within the rectangular guide-slot 122 in the head-plate 25. The block 119 is of such depth that the rear face thereof lies slightly below the rear face of the head-plate 25, as shown in Fig. 9, and extending inwardly from the rear face of the block is a drilled and tapped opening 123 which receives the threaded extremity 124 of the rocking screw 125. A shoulder 126 on this screw is adapted to bear against a plate 127 which overlies the edges of the slot 122 and by tightening the locking screw the shoulder 120 of the block 119 will be drawn tightly into engagement with the front face of the head-plate. Pins 128 projecting from the inside face of the plate 127 engage holes 129 in the rear face of the block 119 and prevent rotation of the plate relatively to the block. The triangular extension 130 on the plate 127 carries a pin 131 with which engages a slot 132 in one end of a bell-crank lever 133. The opposite end of the bell-crank lever is also slotted, as at 134ª, to receive the head of a cap-screw 135. The bell-crank 133 is pivoted on a stud 134 which is threaded into the rear face of the head-plate.

Figure 8:
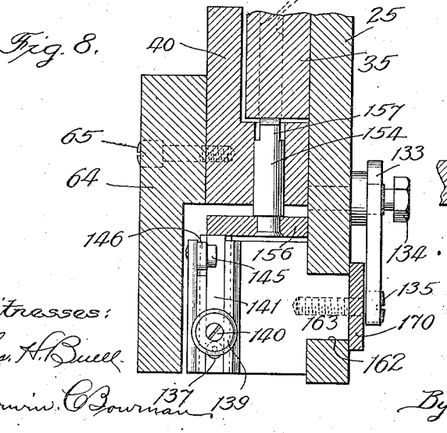
Fig. 8 is an enlarged section, taken on the line 8—8 of Fig. 4.

Referring again to Figs. 4 and 5, it will be seen that the right-hand ends of the guides 99 are secured to a cutter block designated, as a whole, by 136. It is the function of this block to receive the wire 83 and to cut off from the end of the wire a length suitable for forming a staple. With this in view the lower end of the block is drilled horizontally to receive the wire-guiding tube 137, this tube being secured in position by set-screws 138' (see Fig. 14). The right-hand end of the tube lies within a slot in the right-hand face of the cutter-block, the end of the tube being flush with the face of the block, as indicated at 138. The cutter mechanism comprises a bevel-edged cutter-wheel 139, which may be secured in any desired position of angular adjustment by means of a screw 140, as shown in Fig. 8, and is operated by the cutter plunger 141 which reciprocates within the slot in the right-hand face of the cutter-block and is normally held in an elevated position by a compression spring 142 seated within a recess 143 in the cutter block and bearing at its upper end against an outstanding pin 144 secured to the cutter plunger 141. Adjacent its upper end the cutter plunger is recessed inwardly from its front face to receive a boss 145 on the right-hand end of a rocking lever 146 (see Fig. 8). The lever is pivoted centrally, as at 147, within a slot 148 in the top of the cutter-block, and the opposite end of the lever extends clear of the cutter-block and is pivoted, as by a screw 149, to the check-controlling lever 150. This lever lies in front of and parallel to the guide bars 99 and is slotted at its free end to rock upon the pivot-screw 91 of the check 90, as shown at 152 in Figs. 4 and 5. Intermediate its length the lever 150 is formed with a second slot 153 into which projects the pin 104 of the check 103. The cutter-plunger and the levers 146 and 150 which are operated thereby are driven from a tappet 154, which slides within a vertical bore 155 in the block 40, as shown in Figs. 4 and 8. To the lower end of the tappet 154 is secured an enlarged hammer-block 156, against the lower face of which the upper end of the cutter-plunger bears, and the upper end of the tappet is reduced, as at 157, to enter the cam-track 38 of the cam 35. As shown in Figs. 11 and 12, this cam-track is formed by routing out a groove in the periphery of the cam and then filling up a portion of the groove by a ring 158 and an adjustable segment 159, as shown in detail in Fig. 12. The ring and segment are lap-jointed and the segment may be secured in any position of adjustment by a set-screw 160. By this construction the segment 159 may be advanced angularly to correct any wear upon the sharply inclined end 161, and thus the cam-track may be kept in correct timed relation to the other moving parts of the stitcher.

In forming staples of different lengths to accommodate books or other work of varying thickness, it is necessary, of course, that a different length of wire be fed and cut off for each of the various sized staples, and it is further necessary that the cut-off portion of the wire be centrally located with respect to the staple forming and driving mechanism, so that both legs of the staple may be of the same length. In order to effect the desired adjustment of the machine for accomplishing this purpose, I provide means for altering the throw of the feed-lever and connected with this means I provide means for simultaneously and proportionately moving the cutter-block as a whole, so that at the same time the mechanism is adjusted so that the feed-lever will push out a greater length of wire at each operative cycle, the cutter-block will be so located as to sever the wire at such a point as to make the two legs of the staple of equal length. For accomplishing this purpose, I mount the cutter-block 136 in a horizontal slot 162 in the head-plate 25, the block being provided on its rear face with an extension 163 for this purpose. For shifting the cutter-block horizontally within the slot, I provide a hand-wheel 164, the shaft 165 of which is journaled for rotation in a plate 166 secured to the rear face of the head-plate 25, and to prevent endwise movement of the shaft of the hand-wheel, a collar 167 may be formed integrally thereon or secured thereto. The end of the hand-wheel-shaft is bored and tapped to receive a screw 168, and the end of the screw is fixed to an outstanding toe 169 on a plate 170, which is secured as by the cap-screw 135 to the extension 163 of the cutter-block. The plate 170 is of such width as to overlie the edges of the slot 162 and the cutter-block is, therefore, positively retained in any adjusted position.

A spool of wire having been fitted to the journal pin 71 and the wire led therefrom around the guide 78 and through the apertures in the wire-straightener, the check-block 88, feeder-block 100 and cutter-block 136, and the pulley 26 being driven from some suitable source of power, the treadle 31 may be operated to engage the clutch mechanism 37 and the drive-shaft 23 will then be revolved to cut off, form and drive a staple in the following manner:

As the cam 35 revolves the reciprocating feed bar 108 will be moved to the left from the position shown in Fig. 4, this movement being accomplished by means of the cam-groove 37 within which rolls the pintle and roller connection 112. As the bar 108 moves to the left, the rocking lever 105 will be swung about its central pivot and the toothed wheel of the check 103 will grip the wire 83 and draw it forward, causing the end of the wire to pass out of the guide-tube 37, through the slot 63 in the end of the anvil 57 and thence outward a predetermined distance equal to the length of one leg of the staple to be formed. During this movement of the rocking lever 105, the end 157 of the tappet 154 will have been riding within the cam-track 38, and the compression spring 142 will, therefore, have been permitted to elevate the cutter-plunger 141, so that the cutter-wheel will have been raised to clear the opening in the guide-tube 137. As the rocking-lever reaches the end of its stroke, the inclined face 161 of the segment 159 will have come opposite the tappet 154 and acting upon the reduced end 157 of the tappet will have driven the same downwardly, causing the cutter-wheel to sever the wire at the end of the guide-tube 137. As the cutter plunger moves downwardly the lever 146 will rock to swing the lever 150 upward about its pivot 91, and in this movement the lower wall of the slot 153 will engage the pin 104 and raise the check 103 clear of the wire. The tappet and cutter-plunger will remain in the lowered position for approximately two-thirds of a revolution of the cam 35, and during this portion of the revolution therefore the check 103 will be held clear of the wire. This portion of the revolution corresponds to the time in which the feed-lever 105 moves the feed block 100 backward, and it will, therefore, be seen that by means of the cam-track 38 the check 103 of the feed-block will be held clear of the wire while the feed-block is moving backward and until it reaches the left-hand end of its stroke. This is an important feature of my invention as it obviates all danger of buckling or bending the wire during the backward motion of the feed-block. The length of wire having been threaded through the slot 63 in the anvil and cut off by means of the cutter-wheel, the staple former 43 will be moved downwardly by means of the pintle and roller 51 and 52, which operate within the cam-groove 37. As the former moves downwardly its end engages the ends of the wire which project from the slot of the anvil and bend these ends downwardly until, at the lower end of the former's stroke, a complete staple has been formed, the top bar of the staple lying within the slot of the anvil-head, and the legs of the staple lying within the grooves in the internal faces of the former. During this downward movement of the former, the toe 69 of the supporting-block remains pressed backward by the spring 67 and therefore lies within the staple and supports the legs of the same from the inside, holding them within the grooves in the former. As the former reaches the lower end of its stroke, the cam-groove 39 in the cam 36 operates upon the roller 53 to start the downward movement of the staple-driver 47. As this part moves downwardly, it engages the upper inclined face of the anvil-head and forces the latter to slide backward against the spring 58. At the time the anvil-head has been pressed back sufficiently so that the cross-member of the staple is free of the slot 63, the grooved end of the staple-driver engages with the cross member of the staple, and continued downward movement of the driver will, therefore, push the staple downwardly, the legs thereof sliding within the grooves of the former and being supported and prevented from buckling by the toe 69 of the supporting block. As the driver moves downwardly, this block is pushed forward against the spring 67, swinging on its pintles until, at the lower end of the driver's movement, the toe 69 has moved completely out of the staple. The former and driver now occupy the positions shown in Fig. 16, that is, a complete staple has been formed and driven through the work, here indicated as a flat pile of papers, 171. The means for supporting the work in position beneath the driver and former, and the means for clenching the legs of the staple on the lower side of the work will be later described.

When it is desired to adjust the machine to form a staple of greater length, the locking-screw 125 is loosened so as to free the block 119, and the hand-wheel 164 is then rotated. The rotation of this wheel will cause the screw 168 to move into or out of the threaded bore of the hand-wheel-shaft, and by means of the foot 169 and plate 170, the attached cutter-block 136 will be moved horizontally within the slot 162 of the head-plate. In this movement the guide bars 99 will slide within the apertures of the block 88 and the slots 152, 153 of the lever 150, will permit longitudinal motion of this part. Because of the large lower face of the hammer 156, the relation of the cutter-plunger to the tappet will remain unchanged during the movement of the cutter-block. It will thus be seen that by rotating the hand-wheel 164, the cutter-block may be adjusted horizontally so that the end of the guide-tube 137 will lie closer to or farther away from the staple-former, and as this distance determines the length of the left-hand leg of the staple, it will be seen that the mechanism described will operate to change the left-hand leg of the staple without affecting in any manner the operation of the cutter and associated parts.

Figures 6, 7:
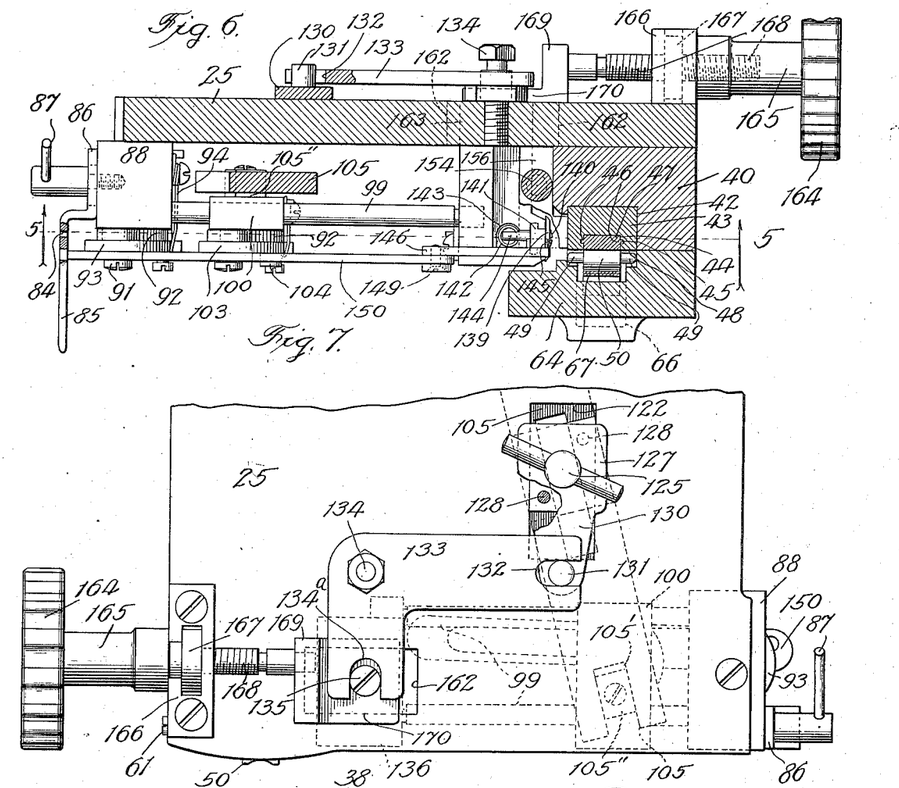
Fig. 6 is a section taken on the line 6—6 of Fig. 4.
Fig. 7 is a detail view of the rear face of the head, showing the connections of the wire-feed adjusting mechanism.

At the same time at which the cutter-block is adjusted, the pivot of the rocking feed-lever 105 will have been shifted longitudinally of the lever, so as to vary the throw of the lower end of the lever and proportionately vary the stroke of the feed-block 100. This result is effected by means of the bell-crank 133. From Fig. 7 it will be apparent that as the plate 170 reciprocates, the head of the screw 135 will operate within the slot 134$^a$ to rock the bell-crank lever about its pivot 134, and by means of the pin and slot connection 131 and 132, at the opposite end of the bell-crank-lever, the plate 127, to which is secured the pivot 115 of the rocking lever, will have been caused to move proportionately within the vertical slot 122 of the head-plate. This movement will have varied the relative lengths of the arms of the rocking lever, so that while the upper end of the rocking-lever always makes the same stroke, the stroke being determined by the throw of the cam-groove 37, the lower end of the lever will have its throw altered in direct proportion to the movement which was imparted to the cutter-block by the hand-wheel 164. Therefore, if the hand-wheel were rotated to move the cutter-block away from the forming mechanism, the pivot 115 will have moved upwardly in its slot, and the relation between the upper and lower arms of the rocking-lever will have been so changed that the feed-block 100 will have a throw of such length as to push the wire through the slot in the anvil-head to a distance equal to the distance between the cutter and the far wall of slide way 42. It will, therefore, be seen that I have provided positively operating means by which the length of wire fed at each revolution of the drive-shaft may be varied, at will, through a single adjustment, and that simultaneously with such adjustment the cutter-block is so moved as to sever the wire at a point which leaves the severed end symmetrically located with respect to the forming and driving mechanism. This forms one of the principal objects of my invention.

A secondary object of the invention is to so improve the construction of the saddle as to render it more readily adaptable for adjustment to accommodate different kinds of work. Referring to Figs. 1 and 2 the saddle, designated 180, is shown as supported on triangular rests 181 cast integrally with the T-head 182, which is adjustably mounted in the arm 23 of the supporting pillar as will later appear. The saddle is formed of hinged sections 183 and 184 and is detachably secured to the T-head 182 by spring-pressed sliding-bolts 185 mounted on the saddle section 183 by some suitable means, such as a plate 186 carrying slide-ways for the bolts and riveted to the saddle section. The bolts 185 are provided with handles 187 by means of which they may be pushed forward to enter locking apertures 188 formed in the apices of the small triangular end-rests 189. The end faces of the plates 186 in which the bolts slide bear against the outer faces of the rests 188, so that when the saddle is placed in position upon the rests 181, and the locking bolts are engaged in their apertures, the saddle is positively locked against all movement excepting angular movement of the hinged sections with relation to one another. In the position of the parts shown in Figs. 1 and 2, the saddle sections rest upon the inclined faces of the parts 181, and in this position of the saddle, work of the character known as book work, in which the stitching is in the center of the sheets of paper, may be accommodated. Adjustable gages 189, 190 are secured to the saddle-sections 183 and 184, respectively, to properly position the work with respect to the staple-driving mechanism. To adapt the saddle for flat work, that is, stitching a flat body of paper, as in binding the edges of sheets together, I provide each of the saddle-sections with a pair of pivoted links 191 and, as shown in Fig. 1, each link is angularly slotted as at 192 for engagement with a bolt 193.

When it is desired to bring the saddle-sections up into the horizontal plane to accommodate flat work, and the bolts 193 are removed, the saddle sections raised into the horizontal plane and the links 192 swung about their pivots until the angular ends of the slots thereof come into registry with the bolt hole in the end of the T-rest. The bolts 193 are then passed through the registering slots of the links, threaded into the bolt-holes and the links clamped in position by the shouldered head of the bolt.

The vertical arm in the T-rest has a bearing within the end of the arm 23 and is adjustable vertically therein in a manner well understood in the art by means of a hand-wheel 194. On the horizontal arm of the T-rest and directly beneath the staple-former and driver is mounted the staple-clencher mechanism, designated as a whole by 195 (see Fig. 16). This mechanism may be of any of the well-known forms and it will not be particularly described as it forms no part of my invention. It is sufficient to state that the pivoted clenchers 196 are moved upwardly to clench the end of the staple-legs by means of the rocking-lever 197 pivoted within the supporting pillar 20 and operated at the proper intervals by a push-rod 198, connecting with some suitable cam and tappet arrangement on the drive-shaft 23. It will be understood that the connections between the rocking-lever 197 and the clenchers 196 are such that the vertical adjustment of the T-rest, to accommodate work of varying thicknesses, does not effect the operation of the clenchers.

While I have shown and described in considerable detail a form of wire-stitching apparatus to which my invention has been applied, it is to be understood that this disclosure is purely illustrative and that my invention is not limited to the specific forms or combinations of elements shown, except in so far as such limitations are included in the appended claims, or must be construed to be included therein in view of the prior art.

What I claim as new and desire to secure by Letters Patent is:—

1. In a machine of the class described, the combination with staple forming and driving mechanism, of an oscillating lever, means operated by said lever for feeding the wire, a cutter-block, means for shifting the position of said cutter-block relatively to said staple forming and driving mechanism, and means connected with said cutter-block shifting means and operable thereby for changing the effective length of said oscillating lever.

2. In a machine of the class described, the combination with staple forming and driving mechanism, of an oscillating lever, a pivot intermediate the length of said lever, means for adjusting said pivot axially of said lever, driving means for one end of said lever, and a wire-feeding device operatively connected to the other end of said lever.

3. In a machine of the class described, the combination with staple forming and driving mechanism, of an oscillating lever, means for driving said lever, a pivot intermediate the length of said lever, means for adjusting said pivot axially of the lever, a wire-feeding device connected to and operated by said lever, a wire-cutter, and connections between said wire-cutter and the pivot of said lever, for simultaneously adjusting the two.

4. In a machine of the class described, the combination with staple forming and driving mechanism, of an oscillating lever, means for driving one end of said lever, a pivot intermediate the length of said lever and longitudinally adjustable therein, a wire-feeding mechanism operated by the other end of said lever, a cutter-block, means for shifting said cutter-block to alter its position with relation to said staple forming and driving mechanism, and connections between said cutter-block and said pivot for causing simultaneous movement of the two.

5. In a machine of the class described, a head-plate, staple forming and driving mechanism mounted on said head-plate, an oscillating lever mounted on said head-plate, a pivot for said lever intermediate its length, means for adjusting the pivot in the head-plate axially of the lever, a cutter-block mounted on said head-plate, and spaced from said staple forming and driving mechanism, means for shifting said cutter-block on said head-plate to alter its relation to said forming and driving mechanism, and mechanical connections between said cutter-block and the pivot of said lever for causing simultaneous movement of the two.

6. In a machine of the class described, a head-plate, staple forming and driving mechanism mounted on said head-plate, a cutter-block adjustably mounted on said head-plate, an oscillating lever, a pivot mounted on said head-plate for adjustment axially of said lever, means for driving said lever, wire-feeding means operated by said lever, a bell-crank pivoted to said head-plate, connections between one end of said bell-crank and said cutter-block, and connections between the other end of said bell-crank and said pivot.

7. In a machine of the class described, a head-plate, staple forming and driving mechanism mounted on said head-plate, a cutter-block mounted on said head-plate for adjustment toward and away from said staple forming and driving mechanism, an oscillating lever, a pivot for said lever mounted in said head-plate for adjustment axially of the lever, driving means for one end of said lever, a feeder-block connected to the other end of said lever for operation thereby, a bell-crank pivoted to said head-plate, connections between one end of said bell-crank and said cutter-block, connections between the other end of said bell-crank and said pivot, and means for adjusting said bell-crank.

8. In a machine of the class described, the combination with staple forming and driving mechanism, of a cutter-block, a cutter mounted therein, a feeder-block, a wire-check mounted on said feeder-block, means for reciprocating said feeder-block, means for driving said cutter, and connections between said cutter and said wire-check operable by cutting movement of the former for moving the latter out of engagement with the wire, for the purpose set forth.

9. In a machine of the class described, the combination with staple forming and driving mechanism, of a wire-cutter, a wire-feeder, a wire-check mounted on said wire-feeder, connections between said wire-check and said cutter, means for reciprocating said wire-feeder, and means for driving said wire-cutter downwardly, said last mentioned means operating to prevent the return stroke of the cutter until after the wire-feeder has completed its return stroke.

10. In a machine of the class described, the combination with staple forming and driving mechanism, of a cutter-block, a cutter mounted for reciprocation in said block, a wire-feeding block mounted for reciprocation toward and away from said cutter-block, a pivoted wire-check mounted on said wire-feeding block, and operative connections between said wire-check and said cutter for controlling the former by operation of the latter.

11. In a machine of the class described, the combination with staple forming and driving mechanism, of a cutter-block adjustable toward and away from said mechanism, a wire-cutter mounted for reciprocation in said block, a feeder-block mounted for reciprocation toward and away from said wire-cutter, a pivoted wire-check mounted on said wire-feeding block, and operative connections between said wire-check and said cutter for controlling the former by operation of the latter, said connections maintaining the same operative relation for any adjusted position of the wire-cutter block.

12. In a machine of the class described, the combination with staple forming and driving mechanism, of a wire-cutting block, mounted for adjustment toward and away from said mechanism, a wire-feeding block mounted for reciprocation toward and away from said wire-cutting block, a cutter mounted for reciprocation in said cutting block, a pivoted wire-check mounted on said feeder block, and connections between said wire-check and said cutter, said connections including a slotted lever.

13. In a machine of the class described, the combination with staple forming and driving mechanism, of a cutter-block, mounted for adjustment toward and away from said mechanism, a feeding block mounted for reciprocation toward and away from said cutter-block, a pivoted wire-check mounted on said feeder-block, a reciprocating cutter mounted in said cutter-block, connections between said wire-check and said cutter for simultaneous operation of the two, said connections maintaining the same operative relation for any adjusted position of the cutter-block, means for reciprocating said feeder-block, means for adjusting said cutter-block, and means operated by said last-named means for changing the throw of the feeder-block proportionately to the adjustment of the cutter-block, for the purpose set forth.

14. In a machine of the class described, and, in combination, a head-plate, a driving shaft journaled in said head-plate, a plurality of cams mounted on said driving shaft, a reciprocating staple former, a reciprocating staple driver, said former and driver being actuated from said cams, an oscillating lever, a pivot for said lever mounted in said head-plate, a reciprocating bar mounted in said head-plate, means for reciprocating said bar from one of said cams, said bar reciprocating in a line at right-angles to the direction of the reciprocation of said former and driver, connections between said reciprocating bar and said oscillating lever, whereby the latter is driven from the former, a feeder-block, guides for said block carried by said head-plate, and extending parallel to said reciprocating bar, and connections between said feeder-block and said oscillating lever, for operation of the latter by the former.

15. In a machine of the class described, a head-plate, a driving shaft extending through and journaled in said head-plate, driving cams mounted on said driving shaft, a vertically reciprocating staple former, a vertically reciprocating staple driver, a horizontally reciprocating bar, a horizontally reciprocating feeder-block, an oscillating lever pivoted intermediate its ends to said head-plate and having one end engaged with said bar and one end engaged with said feeder-block, means for adjusting the pivot of said lever longitudinally thereof, a cutter-block adjustably mounted in said head-plate, means for adjusting said cutter-block toward and away from said former and driver, and connections between said reciprocating parts and said driving cams.

16. In a machine of the class described, a head-plate, vertically reciprocating staple forming and driving means mounted on said head-plate, a horizontally reciprocating bar mounted in said head-plate, a horizontally reciprocating feeding block mounted in said head-plate, an oscillating lever engaging at one end with said reciprocating bar and at the other end with said feeder-block, a pivot for said lever intermediate its length, and carried by said head-plate, a cutter-block mounted in alinement with said feeder-block and adjustable toward and away from said staple forming and driving mechanism, means for adjusting said cutter-block, and means connected with said adjusting means and operated thereby for shifting the pivot of said oscillating lever axially of the same.

17. In a machine of the class described, and, in combination, a head-plate, a driving shaft journaled in said head-plate, a cam disk mounted on said driving shaft, a cam groove formed in the face of said cam disk, a cam-track formed in the periphery of said cam disk, a second cam disk mounted on said driving shaft, a cam groove formed in the face of said second cam disk, a vertically reciprocating staple former, connections for operating said staple former from the cam groove of said first-named disk, a horizontally reciprocating bar, connections for operating said bar from said last-named groove, a horizontally reciprocating feeder-block, connections between said feeder-block and said bar for simultaneous actuation of the two, a vertically reciprocating staple driver mounted in operative relation to said staple former, operating connections for actuating said staple driver from the cam groove of said second-named disk, a cutter-block mounted on said head-plate, a wire-cutter mounted for reciprocation in said block, and operative connections for driving said wire-cutter from the cam track of said first-named cam-disk.

18. In a machine of the class described, a head-plate, staple forming and driving mechanism mounted on said head-plate, a journal for a wire-spool carried by said head-plate, parallel links pivotally supported from said head-plate, a wire-guide pivoted to the free ends of said parallel links, a brake-shoe secured to one of said links, and adapted to bear against the periphery of a spool mounted on said journal, and a spring connected to one of said links and to said head-plate for urging the brake-shoe toward the periphery of the spool.

GOTTFRIED P. BAUMANN.

In presence of—
A. C. FISCHER,
D. C. THORSEN.